(12) United States Patent
Cappelle et al.

(10) Patent No.: US 9,902,658 B2
(45) Date of Patent: Feb. 27, 2018

(54) IRON-BASED NUTRITIVE COMPOSITION

(71) Applicant: PRAYON, Engis (BE)

(72) Inventors: Philippe Jacques Myriam Cappelle, Esneux (BE); Kurt Thierry S. Verhelst, Oud-turnhout (BE)

(73) Assignee: PRAYON, Engis (BE)

( * ) Notice: Subject to any disclaimer, the term of this patent is extended or adjusted under 35 U.S.C. 154(b) by 0 days.

(21) Appl. No.: 14/434,091

(22) PCT Filed: Sep. 18, 2013

(86) PCT No.: PCT/EP2013/069374
§ 371 (c)(1),
(2) Date: Apr. 7, 2015

(87) PCT Pub. No.: WO2014/056688
PCT Pub. Date: Apr. 17, 2014

(65) Prior Publication Data
US 2015/0259258 A1    Sep. 17, 2015

(30) Foreign Application Priority Data

Oct. 10, 2012  (BE) .................. 2012/00667

(51) Int. Cl.
*C05B 17/02* (2006.01)
*C05B 13/06* (2006.01)
(Continued)

(52) U.S. Cl.
CPC .............. *C05B 17/02* (2013.01); *A23K 20/30* (2016.05); *A23L 33/10* (2016.08); *A23L 33/165* (2016.08);
(Continued)

(58) Field of Classification Search
CPC ....... A23K 20/30; A23L 33/10; A23L 33/165; B01F 1/0005; B01F 3/18; C05B 13/06; C05B 17/00
See application file for complete search history.

(56) References Cited

U.S. PATENT DOCUMENTS 3,244,500 A    4/1966 Stinson et al.
3,856,500 A *  12/1974 Cox .................. C05B 13/06
                                                   71/1
(Continued)

FOREIGN PATENT DOCUMENTS

CN       1 274 706 A    11/2000
WO   WO 2012/020427 A1  2/2012

OTHER PUBLICATIONS

International Search Report (PCT/ISA/210) for PCT/EP2013/069374 dated Oct. 30, 2013.

*Primary Examiner* — Jennifer A Smith
(74) *Attorney, Agent, or Firm* — Koppel, Patrick, Heybl & Philpott (57) ABSTRACT

This invention pertains to a process for manufacturing an iron-based nutrient composition comprising at least the steps of supplying an iron source and a phosphate source containing at least one polyphosphate, further comprising a mixing step of the iron source with the phosphate source. The iron source and phosphate sources being in their solid phase, the mixing of the two being solid-solid mixing, leading to the obtaining of a water-soluble, iron-based solid nutrient composition.

20 Claims, 2 Drawing Sheets

(51) Int. Cl.
*B01F 1/00* (2006.01)
*B01F 3/18* (2006.01)
*C05B 17/00* (2006.01)
*A23K 20/20* (2016.01)
*A23L 33/10* (2016.01)
*A23L 33/165* (2016.01)

(52) U.S. Cl.
CPC .............. *B01F 1/0005* (2013.01); *B01F 3/18* (2013.01); *C05B 13/06* (2013.01); *C05B 17/00* (2013.01); *B01F 2215/0055* (2013.01)

(56) References Cited

U.S. PATENT DOCUMENTS

| | | | |
|---|---|---|---|
| 4,190,427 A * | 2/1980 | Ravallo | A01N 25/16 71/28 |
| 2004/0099028 A1 | 5/2004 | Lassilla et al. | 71/31 |
| 2006/0196240 A1 | 9/2006 | Varadachari | |
| 2010/0206032 A1 | 8/2010 | Varadachari | |

* cited by examiner

IRON-BASED NUTRITIVE COMPOSITION

The present invention relates to the field of nutrient compositions and to processes for obtaining the same.

Whether for human or animal nutrition, or for the nutrition of plants or microorganisms, the uptake of minerals (macro- and micronutrients) is essential for the life cycles of these different organisms. However, so that they can be absorbed and acquired it is indispensable that these nutrient elements should be bioavailable i.e. they can be fully solubilised in a solution from which they can be drawn and taken up by these organisms.

However, iron is a micronutrient well-known to be an element that is particularly difficult to solubilise. One of the routes used to solubilise iron is the complexing thereof with an organic agent. However such organic agents are becoming increasingly disputed as food additives and are therefore no longer suitable for the solubilising of iron in food additives or in any microorganism culture intended to be ingested such as some ferments or microalgae, or in edible plants.

Some authors have focused on the possibility of complexing iron with polyphosphates such as pyrophosphate, tripolyphosphate or higher phosphate polymers and the present invention comes within this context.

A slow release fertilizing composition is known from document WO 2012020427, in the form of polyphosphates in which the polyphosphates are soluble in acid. The composition is obtained in liquid phase.

Document CN 1274706 teaches a composition of fertilizers obtained in liquid phase containing potassium sulfate and iron sulfate. After drying, the composition obtained has slow release.

The present invention relates more particularly to a process for manufacturing an iron-based nutrient composition comprising at least the steps of supplying an iron source and supplying a phosphate source containing at least one polyphosphate.

Documents US 2006196240 and US 2010206032 disclose a process for manufacturing a fertilizer with slow release of iron and manganese in particular, wherein the micronutrients are water-insoluble and have delayed release. The process involves a first heating step of a phosphoric acid in the presence of a mixture comprising a source of micronutrients to form a liquid polyphosphate, a second step comprising neutralisation of the said liquid polyphosphate followed by a drying step. Once the polyphosphate has been dried, it is powdered.

The two types of products obtained with each of the aforementioned processes have the disadvantage of being insoluble products with slow release. The nutrient elements are therefore not immediately bioavailable.

Document U.S. Pat. No. 3,244,500 discloses a process in which a micronutrient source such as iron, zinc, copper or manganese is placed in solution in superphosphoric acid. Ammonia is then added at high pressure and high temperature to produce a molten salt of ammonium polyphosphate which is then granulated. This document also describes another process in which the superphosphoric acid and ammonia are first reacted together to form a molten salt of ammonium polyphosphate to which the micronutrient source is added before or after granulation.

Unfortunately, this latter process used to obtain iron-based nutrient compositions is complex, requires drastic manufacturing conditions and does not allow polyvalent nutrient compositions to be obtained finding applications in sectors as varied as foodstuffs, nutrient supplements, microorganism culture, horticulture, hydroponics or fertigation allowing the obtaining of bioavailable iron.

The present invention therefore sets out to bring a solution to these problems by providing a polyvalent nutrient composition in particularly simple manner.

To solve these problems, there is provided according to the invention a process such as mentioned above characterized in that it further comprises a mixing step of said supplied iron source with the said phosphate source containing at least one polyphosphate, the said supplying of the said iron source being the supply of a solid phase of the said iron source, and the said supplying of the said phosphate source containing at least one polyphosphate being the supply of a solid phase of the said phosphate source containing at least one polyphosphate, the said mixing being solid-solid mixing of the said solid phase of said iron source with the said solid phase of said phosphate source containing at least one polyphosphate, leading to the obtaining of a water-soluble, iron-based, solid nutrient composition.

As can be ascertained, the process of the present invention allows the obtaining of a water-soluble, iron-based, solid, nutrient composition in very simple manner via mere solid-solid mixing of the iron source with the phosphate source containing at least one polyphosphate.

The solid nutrient composition obtained is firstly a mineral composition and therefore does not contain any organic compounds thereby imparting particularly polyvalent use thereto, and secondly it does not have an ammonium content dictated by the process contrary to the processes disclosed in document U.S. Pat. No. 3,244,500 in particular. The said processes require the presence of ammonium pro rata to the polyphosphate content. As a result, the nutrient composition obtained cannot be given polyvalent use. For example, the use of said nutrient composition in the horticulture sector would be restrictive on account of the presence of ammonium which is not recommended.

In addition, the solid nutrient composition of the present invention thus obtained is water-soluble therefore providing iron in bioavailable form, and can be easily and quickly placed in solution for applications in which the bioavailable iron source must be in liquid form.

By <<water-soluble composition>> in the meaning of the present invention is meant a composition that is fully soluble in water, namely after dissolution thereof in water the percentage of insolubles obtained is less than 0.2% by weight relative to the weight of the solid composition, preferably less than 0.1% by weight relative to the weight of the solid composition.

Regarding the iron content in a said water-soluble composition in the meaning of the present invention, the dissolution obtained is such that an iron loss of less than 5%, preferably less than 2% more preferably less than 0.5% is noted when the iron changes from its solid form to its dissolved form.

In addition, the obtaining of a solid composition with the process of the invention largely facilitates the storage of the composition in that it is particularly stable whilst being rapidly solubilised if needed and provides iron in bioavailable form, meaning that it is a particular polyvalent composition that can be applied both in the food sector, and in the sector of microorganism and plant culture, without the need for any complex production installation.

It has been shown that the said at least one polyphosphate acts rapidly as complexing agent once the solid form of the composition of the invention is placed in solution, despite a high pH at which iron is scarcely soluble, and allows the iron to be maintained in solution irrespective of iron oxidation state, the iron therefore always remaining bioavailable.

The process of the present invention therefore allows the extremely simple providing of an inorganic, stable, solid nutrient composition in which the iron is bioavailable, hence a fully polyvalent composition in that it can be broadly applied to the sector of food supplements, food additives (phosphates and polyphosphates being food grade additives), to the culture of microorganisms for which the micronutrients must be directly available and in which precipitates must be banned since they perturb cultures causing the agglomeration and sometimes rupture of cell walls and obstructing recirculation mechanisms, to horticulture and its derivative forms such as hydroponic-growing or fertigation in which the bioavailability of iron is most crucial and in which the presence of any precipitate would cause undue clogging of piping as indicated below. Evidently this does not limit the envisaged application of the composition of the present invention which can also be useful for open field cultures, agriculture, arboriculture, floriculture, vegetable farming, fruit farming, grass and lawns.

In one particular embodiment of the present invention, the process after the said solid-solid mixing comprises an aqueous phase dissolution step of the said solid phase of said iron source mixed with the said solid phase of said phosphate phase containing at least one polyphosphate, leading to the forming of a bioavailable iron-based nutrient solution.

As can be ascertained, the placing in solution of the inorganic, solid nutrient composition is obtained by mere dissolution without any complex operating conditions of pressure or temperature, and allows a nutrient solution to be obtained in which the iron is bioavailable. The said soluble composition, after dissolution thereof in water, has a percentage of insolubles of less than 0.2% by weight relative to the weight of the solid composition, preferably less than 0.1% by weight relative to the weight of the solid composition. More particularly, at the time of dissolution of the nutrient composition, the loss of iron can be estimated at less than 5% by weight during the changeover of iron from the solid state to the dissolved state. The nutrient solution thus obtained is stable in that the complexing of the iron is sufficiently fast to prevent precipitation of the liquid phase on storage.

The said inorganic, solid nutrient composition is placed in solution within a dissolution time of less than 15 minutes at 20° C. under magnetic stirring as indicated in the examples, at 400 rpm to obtain solution turbidity of less than 50 NTU (Nephelometric Turbidity Unit), preferably less than 20 NTU and at a standard concentration of 10 mmol Fe/kg. The said nutrient composition has a percentage of insolubles of less than 0.2% by weight relative to the weight of the solid composition, preferably less than 0.1% by weight relative to the weight of the solid composition.

In addition, in one particular embodiment of the process of the invention, the solid composition obtained after the process of the present invention can be directly marketed in the form of a simple mixture for numerous applications since it can be easily and rapidly solubilised.

In one variant of the present invention, the process after the said solid-solid mixing comprises a step for the aqueous phase dissolution of the said solid phase of said iron source mixed with the said solid phase of said phosphate source containing at least one polyphosphate, with the forming of a bioavailable iron-based nutrient solution, followed by a step to convert the said bioavailable iron-based nutrient solution to a water-soluble, iron-based solid nutrient composition. For some applications, a dissolution phase may be required followed by the re-forming of the water-soluble, iron-based solid composition in which the complex rapidly formed by dissolution of the solid-solid mixture in aqueous phase is then present in the solid, water-soluble inorganic nutrient composition.

Advantageously the said conversion step of said bioavailable, iron-based nutrient solution to a solid, water-soluble iron-based nutrient composition is a drying step optionally followed by a step for particle reducing or screening or a granulation step or a spray-drying step.

Advantageously, the said solid phase of said iron source and the said solid phase of said phosphate source containing at least one polyphosphate have particles which are all of size smaller than 5 mm.

In one particular embodiment of the process of the present invention, the $d_{50,v}$ (median particle distribution expressed in volume) of the said solid phase of said iron source divided by the $d_{50,v}$ of the said solid phase of said phosphate source containing at least one polyphosphate represents a relative value of between 0.2 and 5 allowing a homogeneous solid-solid mixture to be obtained after the process of the invention (mixing being sufficient to obtain a homogeneous mixture). The value of $d_{50,v}$ is dependent on the physico-chemical method used which, for example, may be based on a granulation method of one of the compounds of the composition, spray-drying, drying, particle size selection of screening type, a dynamic or static selector, crystallization by crystal maturing/enlarging, grinding, agglomeration of particles in solid and/or liquid phase, etc.

In one variant of the process of the present invention, the said $d_{50,v}$ of the solid phase of said iron source divided by the said $d_{50,v}$ of the said solid phase of said phosphate source containing at least one polyphosphate represents a relative value of 0.2 or lower, preferably between 0.01 and 0.2. The solid-solid mixing operation of the present invention is performed in sufficient manner to obtain a homogeneous mixture. This may lead, via interaction between the two solid phases, to coating of the coarsest particle by the finest particles.

Advantageously, the said $d_{50,v}$ of the said solid phase of said iron source divided by the said $d_{50,v}$ of the said solid phase of said phosphate source containing at least one polyphosphate represents a relative value of 5 or higher.

In one advantageous embodiment, the process of the present invention further comprises a step to supply at least one additional source of micronutrients before, during or after the said solid-solid mixing step. In relation to the application of the nutrient composition thus obtained it may be necessary to add other nutrients to facilitate the use of the composition, for example in the case of horticulture or derivative forms such as hydroponics or fertigation for which consumers generally prefer to use a composition in which the essential micronutrients which at times are also scarcely soluble are contained in bioavailable form.

Advantageously, the said supplying step of said at least one additional source of micronutrients concerns the adding of a solid phase of the said at least one additional source of micronutrient to the said solid phase of said iron source, to the said solid phase of said phosphate source containing at least one polyphosphate, to the said solid-solid mixture of the said solid phase of said iron source and said solid phase of said phosphate source containing at least one polyphosphate, or the separate supplying of a said solid phase of said at least one additional source of micronutrient supplied simultaneously at the said mixing step of said supplied iron source with the said phosphate source containing at least one polyphosphate.

As can be noted, this step to add one or more additional sources of micronutrient can be carried out in the same extremely simple and easy manner.

In one variant of the present invention, the said step to supply the said at least one additional source of micronutrient concerns the supplying of a solid phase of said at least one additional source of micronutrient to the said water-soluble, solid, iron-based nutrient composition.

In another variant of the present invention, the said step to supply the said at least one additional source of micronutrient concerns the supplying of a solid or liquid phase of the said at least one additional source of micronutrient to the said bioavailable, iron-based nutrient solution thereby further enhancing the flexible, simple and polyvalent nature of the process according to the present invention.

Preferably, the said at least one iron source is selected from the group formed by $Fe_2(SO_4)_3 \cdot xH_2O$ where x is a molar coefficient of between 0 and 9, $MFe(SO_4)_2 \cdot 12H_2O$ where M is Na or K, $Fe(NO_3)_3 \cdot xH_2O$ where x is a molar coefficient between 0 and 9, $FeCl_3 \cdot xH_2O$ where x is a molar coefficient between 0 and 6, $Fe_4(P_2O_7)_3$, $FePO_4 \cdot xH_2O$ where x is a molar coefficient between 0 and 4, $FeSO_4 \cdot xH_2O$ where x is a molar coefficient between 0 and 7, $FeCl_2 \cdot xH_2O$ where x is a molar coefficient between 0 and 4, $FeO \cdot xH_2O$ where x is a molar coefficient between 0 and 1, $Fe(NH_4)PO_4H_2O$, iron oxysulfate, and the mixtures thereof.

More particularly according to the present invention, the said phosphate source containing at least one polyphosphate comprises at least one polyphosphate selected from the group formed by sodium and potassium alkaline polyphosphates in powder or granulated form.

Advantageously, the said polyphosphate source comprises an amount of ammonium polyphosphate of less than 70% by weight, preferably less than 50% by weight, more preferably less than 30% by weight, further preferably less than 10% by weight, and still further preferably 5% by weight, relative to the total weight of polyphosphate. The amount of ammonium polyphosphate is determined by elementary analysis (conventional methods) in combination with X-ray diffraction (powder technique) to identify the crystalline phases present.

More particularly, according to the present invention, the said at least one additional source of micronutrient is selected from the group formed by sources of B, Mn, Zn, Cu, Mo, Co, and the mixtures thereof, and wherein the said at least one additional source of micronutrient is supplied in an atomic ratio relative to Fe of between 0.1 and 5 for B, 0.05 and 2.5 for Mn, 0.01 and 1 for Zn, 0.005 and 0.25 for Cu and Mo and between 0.001 and 0.1 for Co, allowing nutrient compositions to obtained particularly adapted for example for applications in horticulture, hydroponics, fertigation or for microorganism cultures.

More particularly, the said at least one additional source of micronutrient is selected from the group formed by $Zn(NH_3)_4SO_4$, $ZnCl_2$, $Zn(NO_3)_2 \cdot xH_2O$ where x is a molar coefficient between 0 and 3, zinc oxysulfate having a total weight fraction of zinc in the range of 20 to 60% relative to the weight of the compound, $ZnSO_4 \cdot xH_2O$ where x is a molar coefficient between 0 and 7, $Cu(OH)_2$, $CuCl$, $CuCl_2$, $3Cu(OH)_2 \cdot CuCl_2$, $CuSO_4 \cdot xH_2O$ where x is a molar coefficient between 0 and 5, $Cu(NH_4)PO_4 \cdot H_2O$, $MnCl_2 \cdot xH_2O$ where x is a molar coefficient between 0 and 4, manganese oxysulfate having a total weight fraction of manganese in the range of 30 to 50% relative to the weight of the compound, $MnSO_4 \cdot xH_2O$ where x is a molar coefficient between 0 and 5, $(NH_4)_6Mo_7O_{24} \cdot 4H_2O$, $H_2MoO_4 \cdot H_2O$, $Na_2MoO_4 \cdot 2H_2O$, $H_3BO_3$, $Na_2B_{10}O_{16} \cdot 10H_2O$, $Na_2B_4O_7$, $Na_2B_4O_7 \cdot 5H_2O$, $Na_2B_4O_7 \cdot 10H_2O$, $Na_2B_8O_{13} \cdot 4H_2O$, $CoCl_2 \cdot 6H_2O$, $Co(NO_3)_2 \cdot 6H_2O$, and the mixtures thereof.

Advantageously, the said phosphate source containing at least one polyphosphate also comprises phosphorus in orthophosphate form in a molar ratio $P_{ortho}/P_{total}$ of between 0 and 0.95, where $P_{ortho}$ represents the number of moles of phosphorus in orthophosphate form and where $P_{total}$ represents the number of moles of total phosphorus, this molar ratio preferably being between 0 and 0.3.

More particularly the said phosphate source comprises at least one polyphosphate selected from the group formed by sodium and potassium alkaline polyphosphates and has a predetermined molar ratio $M/P_{total}$ phosphate source so as to heed the global molar ratio $M/P_{total}$ in the solid-solid mixture of between 1 and 2, preferably between 1.3 and 2 and where M is the total number of moles of sodium and potassium alkaline metal and where $P_{total}$ is the total number of moles of phosphorus.

In particularly advantageous manner in the process of the present invention, the said at least one iron source and the said at least phosphate source containing at least one polyphosphate and optionally the said at least one additional source of micronutrient are supplied in a molar ratio $P_{poly}/Fe$ of between 5 and 50, preferably between 8 and 32 where Fe is the total number of iron moles and where $P_{poly}$ is the total number of phosphorus moles in polyphosphate form.

It has been shown that a said ratio between iron content and polyphosphate content ensures a sufficiently high dissolution rate of the solid composition and allows the iron to be maintained entirely in solution in the final nutrient solution despite the presence of other ions such as Ca2+ and $Mg^{2+}$ which compete with iron via their own complexing reactions with the polyphosphates, and for a sufficient length of time to ensure stability of the nutrient solution obtained after dissolution.

Other embodiments of the process of the present invention are indicated in the appended claims.

The present invention also relates to an inorganic, solid nutrient composition comprising at least one polyphosphate and at least one iron source as micronutrient.

As mentioned previously, such nutrient compositions find applications in numerous sectors as varied as human and animal foods, microorganism culture or horticulture and its derivative forms such as hydroponics and fertigation. However, in numerous applications, iron is an element that appears difficult to dissolve and is often scarcely bioavailable since, depending on the medium in which it is contained, it very often generates the onset of precipitates.

For example, in food additive applications, such as supplemented liquids (dairy foods, beverages, yoghurts, etc.) or any other supplemented food, the medium to which the iron is added is not necessarily at a pH which promotes dissolution of the iron, which may give rise to numerous problems, especially with regard to acceptance of the food product by consumers who are not inclined to ingest a cloudy food or a food containing precipitates.

Regarding plant organisms, whilst carbon is the essential nutrient element for photosynthesis, mineral elements (macro and micronutrients) are just as important for optimal plant growth. These mineral elements are typically acquired by plants from the soil or culture substrate via absorbent root hairs allowing the uptake of water and minerals.

Amongst these micronutrients, iron is the micronutrient for which plants require the highest concentration (in the order of 100 mg/kg of dry tissue), this mineral being needed for synthesis of chlorophyll which itself is essential for photosynthesis that is directly related to plant growth.

Yet iron is very scarcely soluble in aqueous phase and is therefore very scarcely bioavailable for plants not having a gastric acid pH to facilitate bioavailability.

At the present time, numerous cultures (tomatoes, cucumbers, zucchini, lettuce, peppers . . . ) are grown by hydroponic culture or using drip irrigation systems, both these techniques allowing fertigation i.e. providing both hydro- and mineral feed for plants through a nutrient aqueous composition reaching as far as the roots of plants.

However, since these culture techniques are based on the absence of a substrate or on the use of inert substrates (sand, clay beads, rock-wool, . . . ), first they are not aided by the soil's microbial flora which regulates the pH of the soil in more traditional cultures and secondly they do not benefit from the supply of native substances also contained in the soil which could complex the iron making it bioavailable.

This is the reason why much research has been conducted to develop inorganic, solid, fertilizing nutrient compositions of which the constituents, once in solution, should be able to be fully dissolved whether these are iron or other nutrient elements, the said inorganic fertilizing compositions also having to exhibit sufficient buffering capacity.

For example, nutrient compositions in particular inorganic, solid fertilizing compositions comprising micronutrients including iron are disclosed in document U.S. Pat. No. 3,856,500. This document describes fertilizing compositions in the form of polyphosphates, for example in the form of potassium and iron polyphosphates. The micronutrients can be contained in the fertilizing solution in dissolved form, in particular through the addition of chelating agents (gluconic acid . . . ) and/or in the form of finely divided solids. The heavy metal content of the composition in solid form is between 5 and 40% by weight relative to the total weight of the composition in solid form.

Unfortunately, said inorganic, solid nutrient composition does not allow a fertilizing liquid solution to be obtained in which all the constituents including the micronutrients are fully dissolved, or a polyvalent composition applicable in all fields of use such as mentioned above.

The solid, fertilizing composition of document U.S. Pat. No. 3,856,500 gives rise to a colloidal suspension i.e. a liquid solution which, in colloidal suspension, contains particles that are finely divided but sufficiently small for the mixture to be homogeneous.

Said colloidal suspension is unfortunately not adapted for hydroponic growing systems or drip irrigation systems since, even if the particles contained in the colloidal suspension are finely divided, they accumulate over time in the piping conveying the nutrient solution and in the dispensing heads, which causes clogging of the fertilizing system. The system for conveying the nutrient solution, which then becomes inoperative, must be fully dismounted for cleaning or replacement, thereby no longer ensuring plant nutrition and discontinuing fertigation which is nonetheless the primary purpose of this technique. Such operations are time-consuming, monopolise surface areas which can no longer be used for plant production with consequent repercussions in terms of crop yield and production costs.

In addition, with regard to plant organisms without being limited thereto however, in terms of bioavailability the nutrient elements in colloidal suspension and not fully dissolved are not properly taken up or are even not taken up at all by plants via the osmosis phenomenon observed between the vacuole of absorbent root hairs and the culture medium. The plants may therefore become deficient in one or other of the nutrient elements transported by the nutrient solution.

It is the objective of the invention to overcome the disadvantages of the prior art by providing an inorganic, solid nutrient composition of which all the nutrient elements fully dissolve in an aqueous solution without any thereof remaining is suspension (colloidal or otherwise) in the nutrient solution and are bioavailable.

To solve this problem there is provided according to the invention an inorganic, solid nutrient composition such as indicated at the outset, characterized in that the said solid nutrient composition is a water-soluble solid nutrient composition having an iron content of between 0.1 and 5% by weight relative to the total weight of the said solid composition, preferably between 1 and 3% by weight relative to the total weight of the said solid composition.

As previously mentioned, by the term <<water-soluble>> in the meaning of the present invention with regard to iron is meant dissolution such that a loss of iron in the order of less than 5%, preferably less than 2%, more preferably less than 0.1% is noted during the changeover of iron from its solid state to its dissolved form.

In the present invention, it has been shown that a said inorganic, solid nutrient composition comprising at least one polyphosphate and having a narrow, reduced range of iron content between 0.1 and 5%, preferably between 1 to 3% relative to the total weight of the solid composition allows compete dissolution of the iron and of all the constituents of the inorganic, solid nutrient composition when it is placed in an aqueous solution, dissolution being very rapid.

It has been shown that the said at least one polyphosphate acts quickly as complexing agent once the solid form of the composition of the invention is placed in solution, despite a high pH at which iron is scarcely soluble. This maintaining in solution is ensured irrespective of the oxidation state of the iron which therefore always remains bioavailable for plants and does not contribute towards clogging of the fertigation system.

Therefore, most advantageously, the inorganic, solid nutrient composition of the invention can be used for all types of applications such as human or animal foods but also for plant crops such as <<traditional>> crops (soil-growing) or for fertigation (e.g. for drip irrigation, soil-less growing or hydroponics).

Advantageously, the nutrient composition of the present invention further comprises at least one additional source of micronutrient selected from the group formed by sources of B, Mn, Zn, Cu, Mo, Co and the mixtures thereof, and in that the said at least one additional source of micronutrient is contained in an atomic ratio relative to Fe of between 0.1 and 5 for Bn, between 0.05 and 2.5 for Mn, between 0.01 and 1 for Zn, between 0.005 and 0.25 for Cu and Mo, and between 0.001 and 0.1 for Co.

Such contents of micronutrients ensure optimal, adequate supplies of minerals i.e. according to the true needs of living organisms and of plants in particular. However these contents can be modified in relation to application or the stage of plant development which, depending on morphology and growth phase, requires variable proportions of the different macro and micronutrients.

Preferably, according to the present invention, the said at least one polyphosphate is selected from the group formed by sodium and potassium alkaline polyphosphates in powder or granule form.

In addition to acting as complexing agents for iron, the preferred sodium and potassium polyphosphates of the present invention contribute towards the supply of macronutrients needed by living organisms. The said polyphosphates particularly ensure the supply of potassium (K) and phosphorus (P) in useful forms that can be taken up by organisms such as plants.

Preferably according to the present invention, the said at least one polyphosphate is selected from the group formed by pyrophosphates and tripolyphosphates such as tetrapotassium pyrophosphate (TKPP), potassium tripolyphosphate (KTPP), sodium tripolyphosphate (STPP), sodium acid pyrophosphate (SAPP) and tetrasodium pyrophosphate (TSPP), this not excluding the presence of polyphosphate chains of longer length although in the present invention it has been shown that polyphosphates with 2 and 3 P atoms are particularly indicated to ensure the bioavailability of iron in numerous life applications.

Advantageously, according to the invention the said inorganic, solid nutrient composition has a molar ratio $M/P_{total}$ of between 1 and 2, preferably between 1.3 and 2 and where M is the total number of moles of sodium and potassium alkaline metal and where $P_{total}$ represents the total number of phosphorus moles.

In one particular embodiment of the present invention, the water-soluble, solid inorganic nutrient composition also comprises phosphorus in orthophosphate form in a molar ratio of $P_{ortho}/P_{total}$ of between 0 and 0.95 and where $P_{ortho}$ represents the number of phosphorus moles in orthophosphate form and where $P_{total}$ represents the total number of phosphorus moles, this molar ratio preferably being between 0 and 0.3.

Preferably according to the invention, the said inorganic, solid nutrient composition has a molar ratio $P_{poly}/Fe$ of between 5 and 50, preferably between 8 and 32 where Fe corresponds to the total number of moles of iron and where $P_{poly}$ designates the number of moles of phosphorus in the form of polyphosphate chains obtained for example by analyses of $P_{total}$ and $P_{ortho}$ allowing the determination of the number of $P_{poly}$ moles by applying the equation $P_{poly}=P_{ortho}-P_{ortho}$.

As mentioned previously, this ratio between the iron content and the polyphosphate content ensures a sufficiently fast dissolution rate of the solid composition and allows the iron to be maintained entirely in solution in the final nutrient medium despite the presence of other ions such as $Ca^{2+}$ and $Mg^{2+}$ which compete with iron via their own complexing reactions with the polyphosphates.

According to the present invention, preferably the said at least one iron source is selected from the group formed by $Fe_2(SO_4)_3.xH_2O$ where x is a molar coefficient of between 0 and 9, $MFe(SO_4)_2.12H_2O$ where M is Na or K, $Fe(NO_3)_3.xH_2O$ where x is a molar coefficient between 0 and 9, $FeCl_3.xH_2O$ where x is a molar coefficient between 0 and 6, $Fe_4(P_2O_7)_3$, $FePO_4.xH_2O$ where x is a molar coefficient between 0 and 4, $FeSO_4.xH_2O$ where x is a molar coefficient between 0 and 7, $FeCl_2.xH_2O$ where x is a molar coefficient between 0 and 4, $FeO.xH_2O$ where x is a molar coefficient between 0 and 1, $Fe(NH_4)PO_4.H_2O$, iron oxysulfate, and the mixtures thereof.

Preferably, the said at least one additional source of micronutrients is selected from the group formed by $Zn(NH_3)_4SO_4$, $ZnCl_2$, $Zn(NO_3)_2.xH_2O$ where x is a molar coefficient between 0 and 3, zinc oxysulfate having a total weight fraction of zinc in the range of 20 to 60% relative to the weight of the compound, $ZnSO_4.xH_2O$ where x is a molar coefficient between 0 and 7, $Cu(OH)_2$, CuCl, $CuCl_2$, $3Cu(OH)_2.CuCl_2$, $CuSO_4.xH_2O$ where x is a molar coefficient between 0 and 5, $Cu(NH_4)PO_4.H2O$, $MnCl_2.xH_2O$ where x is a molar coefficient between 0 and 4, manganese oxysulfate having a total weight fraction of manganese in the range of 30 to 50% relative to the weight of the compound, $MnSO_4.xH_2O$ where x is a molar coefficient between 0 and 5, $(NH_4)_6Mo_7O_{24}.4H_2O$, $H_2MoO_4.H_2O$, $Na_2MoO_4.2H_2O$, $H_3BO_3$, $Na_2B_{10}O_{16}.10H_2O$, $Na_2B_4O_7$, $Na_2B_4O_7.5H_2O$, $Na_2B_4O_7.10H_2O$, $Na_2B_8O_{13}.4H_2O$, $CoCl_2.6H_2O$, $Co(NO_3)_2.6H_2O$, and the mixtures thereof.

Advantageously according to the present invention, the nutrient composition as described in more detail in the examples, has a percentage of insolubles of less than 0.2% by weight relative to the weight of the solid composition, preferably less than 0.1% by weight relative to the weight of the solid composition and a dissolution time of less than 15 minutes at 20° C. under magnetic stirring at 400 rpm for solution turbidity of less than 50 NTU, preferably lower than 20 NTU and a standard concentration of 10 mmol Fe/kg of solution. For example, the solution obtained from the solid composition may reach 50% by weight thereof.

The presence of insoluble particles generates turbidity in the solution, the value of which is dependent on several factors such as concentration of solid particles, particle size distribution and particle refractive index in relation to the liquid phase. The filtration test provides direct measurement of the weight percentage of insoluble particles. Finally, iron analysis of the solid residue retained on the filter allows evaluation of relative iron loss. The protocols and experimental conditions applied to measure these three parameters are detailed in the examples below.

With these three parameters it is possible to verify whether the solution meets the requirements defined above, which correspond to a composition which can be qualified as being water-soluble provided these parameters are heeded.

Preferably according to the invention, the said inorganic solid nutrient composition has a clumping index such as explained in the examples of less than 100, preferably less than 50.

Advantageously according to the invention, the said inorganic, solid nutrient composition has a storage time of more than 6 months, preferably more than 12 months at 25° C.

Other embodiments of the said inorganic, solid nutrient composition of the invention are indicated in the appended claims.

The present invention also relates the use of an inorganic, solid nutrient composition of the invention to produce a solution in which the macronutrients and micronutrients are bioavailable.

More particularly, the invention relates to the use of an inorganic, solid nutrient composition of the present invention as fertilizing composition for horticulture, fertigation, hydroponics and the like.

In addition, and advantageously the invention also relates to the use of the composition of the invention as food supplement or food additive for foods or beverages enriched with bioavailable iron.

For example, the composition of the invention can be used to ensure or supplement plant nutrition in soil-less culture systems or in conventional soil-growing cultures. Said composition according to the invention can also be used in sectors of human or animal foods (beverages or foods) or for the nutrition of microorganisms.

Other embodiments of use according to the invention are indicated in the appended claims.

Other characteristics, details and advantages of the invention will become apparent from the examples given below that are non-limiting and given with reference to the appended Figures and examples.

EXAMPLES

Tests were conducted under laboratory conditions to determine the physicochemical characteristics of the inorganic, solid nutrient composition of the invention. Dissolution, ageing and clumping tests were carried out for which the results are given below.

These different tests were performed after mixing a first component comprising at least one polyphosphate for 30 seconds in a powder mixer (Magimix, type 5200) with a second component comprising at least one iron source. These two components (or raw materials) were used as such without any prior treatment and were added simultaneously to the mixer.

Example 1: Dissolution and Ageing Tests

Six compositions such as reproduced in Table 1 were prepared.

TABLE 1

| | Solid composition | | Dissolution test | | | |
|---|---|---|---|---|---|---|
| | Type of poly-phosphate | Iron source | MR (Poly/Fe) | [Fe] mmol/kg solution | Dissolution time (min) | Stir time (min) | pH |
| 1 | KTPP (a) | FeSO$_4$•7H$_2$O (e) | 10 | 10 | <10 | 15 | 9.4 |
| 2 | KTPP (b) | FeSO$_4$•H$_2$O (f) | 10 | 50 | <15 | 15 | 8.7 |
| 3 | KTPP (a) | FeCl$_2$•4H$_2$O (g) | 10 | 50 | 4 | 15 | ND |
| 4 | TKPP (c) | FeSO$_4$•7H$_2$0 (e) | 10 | 20 | 5 | 840 | 9.8 |
| 5 | STPP (d) | FeSO$_4$•7H$_2$O (e) | 14 | 50 | <15 | 15 | ND |
| 6 | KTPP (b) | FeSO$_4$•7H$_2$O (e) | 30 | 50 | <10 | 15 | 9.6 |

(a) 46.4 weight % total P$_2$O$_5$, 53.3 weight % K$_2$O, 1.6 wt. % > 86 wt. % < 0.5 mm
(b) 46.6 weight % total P$_2$O$_5$, 53.2 wt. % K$_2$O, 0.6 wt.. % < 2 mm, 34 wt. % < 0.5 mm
(c) 42.7 weight % of total P2O5, 57.0 weight % of K20
(d) 57.6 weight % total P$_2$O$_5$, 42.1 weight % Na$_2$O
(e) 19.2 weight % total iron
(f) 28.7 weight % total iron (particle size of 0 to 0.5 mm)
(g) 28.0 weight % total iron
ND = Non-determined value Dissolution Test The solid powder mixtures obtained were immediately placed in a beaker (inner diameter 6 cm) containing dissolution water at 20° C. and stirred with a magnetic rod (length 4 cm) at a rate of 400 revs per minute. Each final solution obtained weighed 250 g and contained a total of 10, 20 or 50 mmol Fe/kg of solution.

After a given stir time, the final degree of dissolution was evaluated by measuring:
  the turbidity of the solution using a laboratory nephelometer: HACH Ratio/XR; and
  the concentration of insolubles (residual solid particles).

The content of insolubles for which results are expressed in relation to the initial solid weight, was measured by gravimetric analysis via filtration through a membrane of size 0.45 μm (Porafil NC type by Macherey-Nagel), the residue being washed and dried at 105° C.

Quantitative analysis was also performed of the iron contained in this solid residue to determine relative iron loss.

Table 2 gives the characteristics of the six compositions with regard to the criteria of turbidity, percentage of insolubles and iron loss. These criteria were recorded for two different ages of each solubilised composition such as indicated in Table 2.

TABLE 2

| | Evaluation 1 of the solution | | | | Evaluation 2 of the solution | | | |
|---|---|---|---|---|---|---|---|---|
| | Age of solution | Turbidity (NTU) | Insolubles (wt. %) | Iron loss (relative %) | Age of solution | Turbidity (NTU) | Insolubles (wt. %) | Iron loss (relative %) |
| 1 | 15 min | 2 | 0.06 | <1 | 24 D | 2 | 0.06 | <1 |
| 2 | 15 min | 40 | 0.08 | <1 | 21 D | 45 | 0.09 | <1 |
| 3 | 10 min | 11 | 0.06 | <1 | ND | ND | ND | ND |
| 4 | 10 min | <50 | 0.08 | <1 | 14 H | >2000 | 15 | >50 |
| 5 | 15 min | 10 | 0.08 | <1 | 7 D | 410 | 0.7 | 16 |
| 6 | 15 min | 27 | 0.07 | <1 | 24 D | 24 | 0.08 | <1 |

ND = Non-determined value
D = days
H = hours

To meet the criteria of the present invention, the placing in aqueous solution of the inorganic solid nutrient composition must allow the obtaining of a nutrient solution in which the different components are fully and quickly dissolved. In the meaning of the present invention, it is considered that all the components are dissolved if:
  the measured turbidity is lower than 50 NTU; and
  the weight percentage of insolubles is less than 0.2%.

Also, the iron loss must be less than 5% during the changeover from the solid state to the dissolved state of this metal element.

After a first evaluation performed 10 to 15 minutes after the placing in solution of the said inorganic nutrient composition of the invention, it was ascertained that the different tested compositions (No. 1 to 6 in Table 2) all allowed the three criteria to be met irrespective of type of polyphosphate, iron source or iron concentration in the tests conducted.

Similarly it was most advantageously observed that some compositions exhibited an increase in stability, even after dissolution. These were compositions No. 1, 2 and 6 which after 20 to 21 days still displayed reduced turbidity and reduced insoluble content.

Example 2: Stability of the Solid Compositions

The product shelf-life and hence stability were determined by subjecting the product to the same dissolution test after different compression times at 25° C. under the conditions of the clumping test described below.

According to the invention the product expires as soon as:
the measured turbidity is higher than 50 NTU; and
the weight percentage of insolubles is higher than 0.2%.

Two solid compositions of the invention were considered (Table 3) to evaluate whether ageing of the solid form has an influence on its dissolution when placed in solution.

A first composition less than one day old was compared with a second composition 21 days old.

TABLE 3

| | Solid composition | | | Dissolution test | | |
|---|---|---|---|---|---|---|
| Type of poly-phosphate | Iron source | MR (Poly/Fe) | Age | [Fe] mmol/kg solution | Dissolution time (mm) | pH |
| 1 KTPP (a) | FeSO$_4$•7H$_2$O (b) | 10 | <1 D | 50 | 3 min | 8.3 |
| 2 KTPP (a) | FeSO$_4$•7H$_2$O (b) | 10 | 21 D* | 50 | 5 min | ND |

(a) 46.4 weight % total P$_2$O$_5$, 53.3 weight % K$_2$O, 1.6 wt. % > 1 mm, 86 wt. % < 0.5 mm
(b) 19.2 weight % total iron
ND = Non-determined value
D = days
*21-day ageing under compression at a temperature of 25° C.

As can be seen, the two solid forms exhibit an equivalent dissolution time in the order of 3 to 5 minutes for solution turbidity of lower than 50 NTU and weight percentage of insolubles of less than 0.2%, which demonstrates the stability over time of the solid form of the composition of the invention when it is stored at a temperature of 25° C.

Example 3: Clumping Tests (Clumping Index)

Measurement of the clumping index was obtained using a laboratory test developed by the inventors to quantitate the clumping tendency of a solid composition and thereby characterize the composition. This index reflects the mechanical strength of a core sample of the product obtained after a compression time of 21 days at 25° C. in a sealed cell preventing practically all moisture or oxygen exchange with ambient air.

The compression cell comprises two semi-cylinders in stainless steel (obtained by cutting a tube along its longitudinal median) held together around a disc by means of a removable locking plate. The disc also in stainless steel closes the cylinder at its base. The diameter of the disc is 46 m for a height of 10 mm. The cylinder height is 80 mm. The locking plate and two semi-cylinders can be easily removed without jolting the disc. A polypropylene piston sliding freely inside cylinder and surmounted by a weight of 6 kg is used to compress the product from above. The disc-shaped piston has a diameter of 44 mm and height of 30 mm.

The assembly (with the exception of the 6 kg weight) was wrapped in a sachet composed of a multilayer plastic film comprising an aluminium sheet, and was heat welded to prevent any exchange of moisture with ambient air. The sealing of the sachet was verified by gravimetric analysis, the variation in relative weight of the product not to exceed 0.2% over the test time. Homogeneous filling of the cell was ensured by performing this operation progressively whilst rotating the cell. The product was packed using the piston before completion of filling to avoid excessive packing during the actual compression phase. The weight of the composition varied between 70 and 120 g. The top of the piston must project from the cylinder up until the end of the compression phase otherwise there is a risk that the weight will not apply the expected pressure of 0.36 bar. Care must also be taken to ensure that the weight is fully centred relative to the piston.

The assembly was left to stand throughout the entire compression phase. Dynamometric measurement was performed no later than 4 hours after removal of the weight. After removing the locking plate and the two semi-cylinders without jolting the core of product, a dynamometer test bench was used to measure the rupture force of the core. This force was applied vertically to the centre of the disc-shaped piston via a metal tip. The tip was driven forward by the dynamometer test bench at a constant speed of 60 mm/minute. The rupture force in Newtons (N) measured in this manner corresponds by definition to the clumping index. This index is 0 if the product flows at the time of mould release or if the core collapses between mould release and dynamometric measurement.

The dynamometer scale used in the laboratory was limited to 460 N. When this force at the end of the scale was insufficient to cause rupture of the core, the core was subjected to a second dynamometric measurement after withdrawing the piston and replacing the tip with a calibrated blade.

The results obtained for the three inorganic, solid nutrient compositions of the invention are given in Table 4 below. A P$_{poly}$/Fe ratio of 10 was set for each of the compositions. A compression time of 21 days at 25° C. was applied.

TABLE 4

| | Type of poly-phosphate | Iron source | Ageing before compression* | Clumping index (1) | Rupture force with blade (Newton) |
|---|---|---|---|---|---|
| 1 | KTPP (a) | FeSO$_4$•7H$_2$O (c) | None | >460 | 131 |
| 2 | KTPP (a) | FeSO$_4$•7H$_2$O (c) | 24 hours | 83 | — |
| 3 | KTPP (a) | FeSO$_4$•6-7H$_2$O (b) | 24 hours | 32 | — |

(a) 46.6 weight % total P$_2$O$_5$, 53.2 weight % K$_2$O, 0.6 wt. % >2 mm, 34 wt. % <0.5 mm
(b) 19.8 weight % total iron
(c) 19.2 weight % total iron
(1) Rupture force in Newtons with the disc
*reaction between the two constituent powders before compression of the mixture resulting in a coating phenomenon.

To meet the criteria of the present invention, the inorganic solid nutrient composition must be able to be stored without an increase in weight. This characteristic is heeded when the clumping index is lower than 100 after compression at 25° C. As shown in Table 4, and for a fixed molar ratio $P_{poly}$/Fe of 10, it was found that a clumping index lower than 100 was observed for compositions 2 and 3 i.e. after ageing for 24 hours before compression at 25° C. for 21 days.

Example 4: Hydroponic Culture (Cucumber)

Hydroponic growing tests (substrate-free) in a greenhouse were carried out for 6 weeks to verify the efficacy of the nutrient solution of the invention.

Previously, cucumbers had been seeded in vermiculite to obtain plantlets. These plantlets were transferred 3 weeks after seeding to hydroponic growing conditions i.e. in plastic boxes (50×30×20 cm) fitted with a perforated PVC lid. These boxes were filled with water and nutrient solution and the plantlet roots were placed in the aqueous solution through the perforations of the lid. The lid allowed the nutrient solution to be isolated from the outside medium to prevent penetration of light and/or contaminant which could deteriorate the fertilizing nutrient solution. The aerial portion of the plant was tutored with an inert, flexible material. The boxes were also equipped with nozzles allowing the injection of air into the nutrient solution to provide oxygen to the root system.

The level of water in the boxes was checked twice a week and the amount of nutrient solution adjusted in relation to the electrical conductivity of the nutrient solution. The electrical conductivity of the solution was initially set at 3 mS·cm$^{-1}$ and was held between 2.5 and 3.5 mS·cm$^{-1}$ throughout growing time.

The pH of the nutrient solution was measured three times a week and adjusted if necessary through the addition of HNO$_3$+H$_2$SO$_4$ mixture (ratio 12:1) or KOH.

a) Treatments: Tested Iron Sources

Three iron sources (P1 to P3) of the invention containing ferric sulfate were tested at two different pH values of the nutrient solution and compared with a standard commercial organic iron chelate as control (P4). The characteristics of the tested solutions are given in Table 5 below.

TABLE 5

| Solution | mmol Ptotal/l | μmol Fe/l | pH | Fe complexing agent | MR ($P_{poly}$/Fe) |
|---|---|---|---|---|---|
| P1a | 1.5 | 15 | 5.2-5.6 | TKPP (a) | 10 |
| P1b | 1.5 | 15 | 6.4-6.8 | TKPP (a) | 10 |
| P2a | 1.5 | 15 | 5.2-5.6 | KTPP (b) | 10 |
| P2b | 1.5 | 15 | 6.4-6.8 | KTPP (b) | 10 |
| P3a | 1.5 | 15 | 5.2-5.6 | KTPP (b) | 20 |
| P3b | 1.5 | 15 | 6.4-6.8 | KTPP (b) | 20 |

TABLE 5-continued

| Solution | mmol Ptotal/l | μmol Fe/l | pH | Fe complexing agent | MR ($P_{poly}$/Fe) |
|---|---|---|---|---|---|
| P4a | 1.5 | 15 | 5.2-5.6 | organic chelate | 0 |
| P4b | 1.5 | 15 | 6.4-6.8 | organic chelate | 0 |

(a) 42.7 weight % total P$_2$O$_5$, 57.0 weight % K$_2$O
(b) 46.6 weight % total P$_2$O$_5$, 53.2 weight % K$_2$O The other nutrient elements listed in Table 6 were supplied to the nutrient medium in accordance with recommended standards for cucumber culture.

TABLE 6

| Nutrient | Target value | |
|---|---|---|
| NH4 | 0.1 | mmole/l |
| K | 8 | mmole/l |
| Ca | 6.5 | mmole/l |
| Mg | 3 | mmole/l |
| NO3 | 18 | mmole/l |
| SO4 | 3.5 | mmole/l |
| Mn | 7 | μmole/l |
| Zn | 7 | μmole/l |
| B | 50 | μmole/l |
| Cu | 1.5 | μmole/l |
| Mo | 1 | μmole/l |

Each treatment was repeated 4 times, each repeat entailing a box containing water and the tested nutrient solution and 2 cucumber plants.

b) Analyses

To evaluate the efficacy of the iron sources P1 to P3 of the invention, the following parameters were measured at the end of growing time (after 6 weeks):
production of biomass (dry weight);
micronutrient concentrations: tissue analysis.

Statistical analysis (ANOVA, P<0.05) was applied to compare the different treatments.

b.1. Biomass Production

Figure 1:
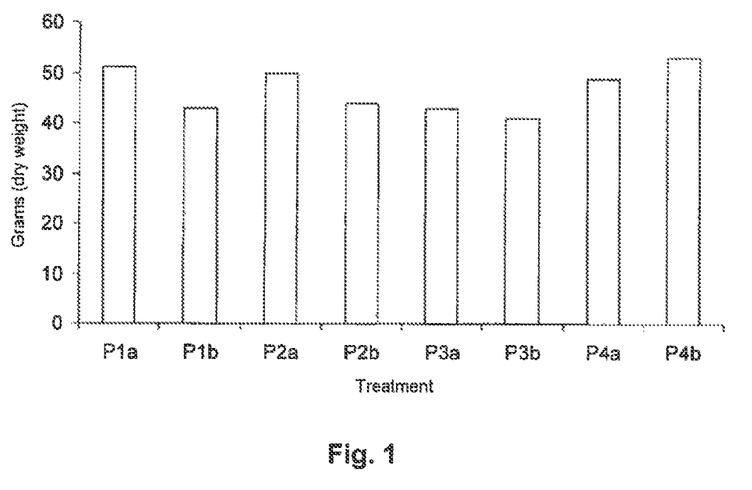
FIG. 1 illustrates the results obtained when measuring the biomass of cucumber plants (grams in dry weight) fed with different nutrient solutions.

The cucumber plants were harvested after 6 weeks' hydroponic growth in accordance with the above-described conditions. After drying the tissues, the dry weight was determined of the cucumber plants (roots+aerial portion of the plants). FIG. 1 gives the result obtained.

As can be seen, no significant difference was observed between the different treatments applied in terms of biomass at the end of growth.

b.2. Nutrient Concentrations

Figure 2:
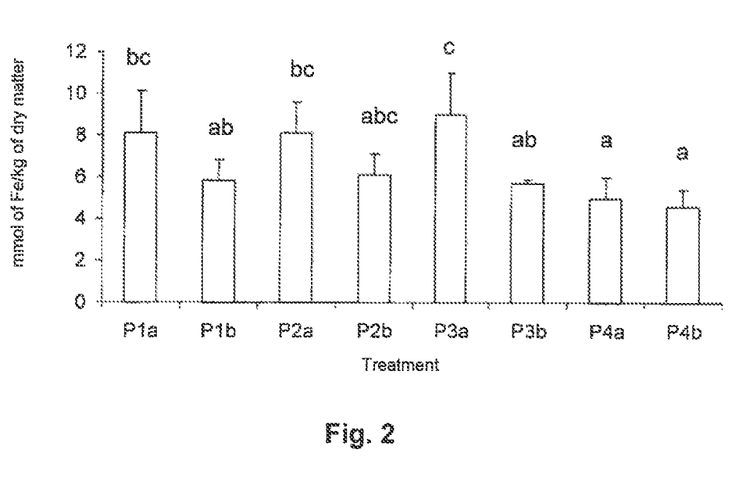
FIG. 2 gives the iron concentrations (mmol of Fe/kg of dry matter) obtained from measurements of cucumber plants fed with different nutrient solutions.

The nutrient concentrations in mmol/kg dry matter (except for copper in μmol/kg dry matter) were determined on dry tissue following techniques conventionally used for the assay of nutrients. The results obtained (n=4) are given in Table 7 below. FIG. 2 only concerns the iron concentration measured from the dry matter.

TABLE 7

| | P1a | P1b | P2a | P2b | P3a | P3b | P4a | P4b |
|---|---|---|---|---|---|---|---|---|
| K | 1565 | 1508 | 1653 | 1608 | 1609 | 1503 | 1856 | 1542 |
| Na | 18 | 18 | 30 | 17 | 19 | 16 | 26 | 19 |
| Ca | 921 | 958 | 911 | 984 | 886 | 958 | 877 | 1048 |
| Mg | 332$^{ab}$ | 353$^{ab}$ | 323$^{ab}$ | 362$^{ab}$ | 296$^a$ | 334$^{ab}$ | 319$^{ab}$ | 377$^b$ |
| P$_{total}$ | 385 | 371 | 414 | 398 | 375 | 83 | 413 | 396 |
| Fe | 8.2bc | 5.9$^{ab}$ | 8.2$^{bc}$ | 6.1$^{abc}$ | 9.0$^c$ | 5.8$^{ab}$ | 4.9$^a$ | 4.5$^a$ |
| N$_{total}$ | 4748 | 4439 | 4645 | 4665 | 4656 | 4410 | 4756 | 4575 |
| Mn | 1.8 | 1.9 | 1.5 | 2.0 | 1.6 | 2.0 | 1.7 | 1.7 |
| Zn | 2.4$^{ab}$ | 2.3$^{ab}$ | 2.3$^{ab}$ | 2.6$^b$ | 2.2$^{ab}$ | 2.3$^{ab}$ | 1.5$^a$ | 1.4$^a$ |

TABLE 7-continued

|    | P1a | P1b | P2a | P2b | P3a | P3b | P4a | P4b |
|----|-----|-----|-----|-----|-----|-----|-----|-----|
| B  | 4.1 | 3.6 | 4.1 | 3.8 | 4.0 | 3.9 | 4.2 | 3.9 |
| Cu | 342 | 349 | 352 | 345 | 371 | 374 | 292 | 330 |
| Mo | 106 | 72  | 103 | 80  | 104 | 81  | 104 | 106 |

Statistical analysis (ANOVA) evidenced that the plants fed with solutions P1a, P2a and Pa (pH between 5.2 and 5.6) contained more iron than the plants fed with the nutrient solution of reference P4a at this same pH. At higher pH (P1b, P2b, P3b and P4b where the pH was between 6.4 and 6.8) no significant difference was noted for iron, which could be accounted for by lesser complexing on account of the higher baseness of the solution.

b.3 Chlorosis

Throughout the 6 weeks of hydroponic growth, symptoms of iron deficiency were visually evaluated.

Figure 3:
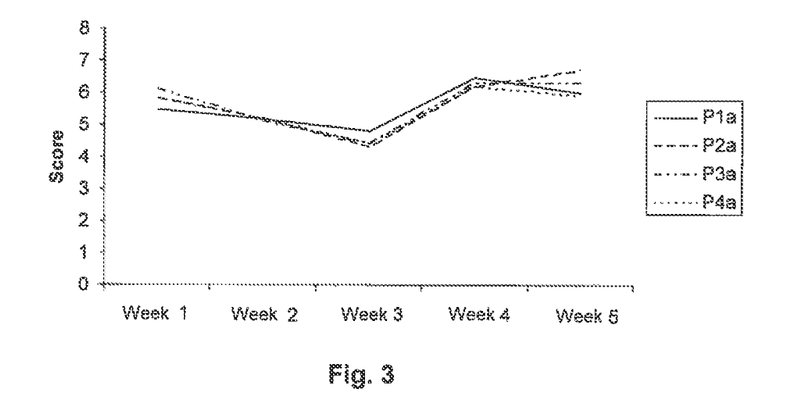
FIGS. 3 and 4 illustrate the scores recorded after visual estimation of chlorosis in cucumber plants fed with different nutrient solutions.
Figure 4:
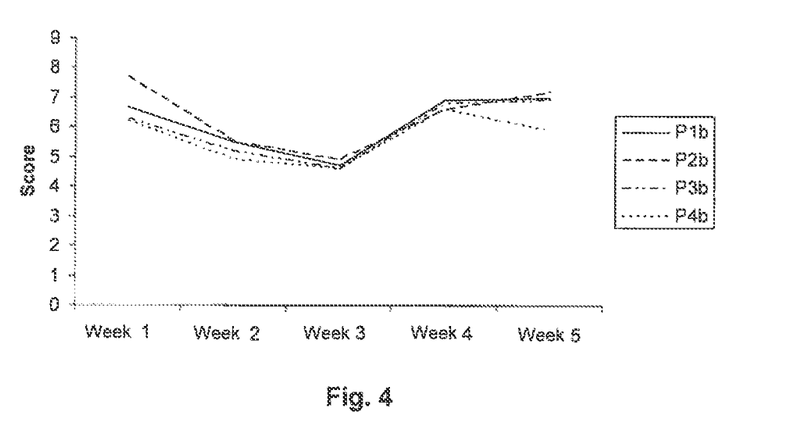

Chlorosis, indicative of iron deficiency, was evaluated using scores ranging from 0 (green leaf colour) to 10 (yellow leaf colour). FIG. 3 gives the results obtained when the pH of the nutrient solution was between 5.2 and 5.6 whilst FIG. 4 gives the results obtained when the pH of the nutrient solution was between 6.4 and 6.8.

With these two Figures it can be ascertained that chlorosis having equivalent scores was observed over time for the different treatments applied irrespective of pH.

It was therefore found that the compositions of the invention allow better uptake of macro- and micronutrients by plants, in particular better iron uptake.

Comparative Example

The example of patent CN 1274706 was reproduced on laboratory scale. The solid obtained after the procedure was subjected to the dissolution test in Example 1 of the present invention.

The solution obtained displayed turbidity at 10 mmoles Fe/kg of solution which exceeded 1000 NTU.

The content of insolubles also reached 59% relative to the weight of powder used for the dissolution test. The composition of CN 1274706 is therefore in no way a water-soluble solid composition.

The present invention is evidently not limited to the embodiments described above and numerous modifications can be made thereto without departing from the scope of the appended claims.

The invention claimed is:

1. A process for manufacturing an iron-based nutrient composition suitable for preparing a solution having substantially no, insolubles comprising an iron source in a solid form and a phosphate source in a solid form, said phosphate source containing at least one polyphosphate, said process comprising mixing said iron source with the phosphate source, the iron source and the phosphate source being provided as a solid phase, said mixing being solid-solid mixing of said iron source and said phosphate source in a molar ratio $P_{poly}$/Fe of between 5 and 50 to form a mixture, said mixture being soluble in water and after a dissolution in water having a percentage of insolubles of less than 0.2% by weight relative to the weight of the solid composition.

2. The process for manufacturing an iron-based nutrient composition according to claim 1 further comprising, after the said solid-solid mixing, a dissolution step in aqueous phase of the said solid phase, to form an iron-based nutrient solution.

3. The process for manufacturing an iron-based nutrient composition according to claim 1 further comprising, after the said solid-solid mixing, a dissolution step in aqueous phase, leading to the formation of a bioavailable, iron-based nutrient solution, followed by a conversion step of the said bioavailable iron-based nutrient solution to a water-soluble, solid iron-based nutrient composition.

4. The process for manufacturing an iron-based nutrient composition according to claim 2 wherein the iron-based nutrient solution is dried, the dried solution subjected to a particle size reduction or screening or granulation or the iron based nutrient solution is spray dried.

5. The process for manufacturing an iron-based nutrient composition according to claim 1 wherein the said solid phase comprises particles which are all smaller than 5 mm.

6. The process for manufacturing an iron-based nutrient composition according to claim 5 wherein the said particles have a $d_{50,v}$ value and wherein the $d_{50,v}$ of the said solid phase of said iron source divided by a $d_{50,v}$ of the said solid phase of said phosphate source represents a relative value of between 0.2 and 5.

7. The process for manufacturing an iron-based nutrient composition according to claim 5 wherein the said $d_{50,v}$ of the said solid phase of said iron source divided by the said $d_{50,v}$ the said solid phase of said phosphate source represents a relative value of 0.2 or lower.

8. The process for manufacturing an iron-based nutrient composition according to claim 5 wherein the said $d_{50,v}$ of the said solid phase of said iron source divided by the said $d_{50,v}$ of the said solid phase of said phosphate source represents a relative value of 5 or higher.

9. The process for manufacturing an iron-based nutrient composition according to claim 1 further comprising a step of providing at least one additional source of micronutrients before, during or after the said solid-solid-mixing step.

10. The process for manufacturing an iron-based nutrient composition according to claim 9 wherein said at least one additional source of micronutrients is a solid phase micronutrient source (i) provided to the said solid phase of said iron source, (ii) provided to the solid phase phosphate source, (iii) provided to the said solid-solid mixture of the said solid phase of said iron source and of said solid phase of said phosphate source, or (iv) supplied simultaneously at the mixing step of the iron source and said phosphate source.

11. The process for manufacturing a water soluble iron-based nutrient composition according to claim 9, further comprising, after the said solid-solid mixing, a dissolution step in an aqueous solution of the solid phase of said iron source mixed with the said solid phase of said phosphate source to form a bioavailable, iron-based nutrient solution, subjecting said iron-based nutrient solution to a drying step, optionally followed by a particle size reducing or screening step or granulation step or subjecting the solution to a spray-drying step, wherein at least one additional source of micronutrients is provided to the said water-soluble, solid iron-base nutrient composition.

12. The process for manufacturing an iron-based nutrient composition according to claim 9, further comprising, after the said solid-solid mixing, a dissolution step in aqueous phase of the said solid phase of said iron source mixed with the said solid phase of said phosphate source and the formation of a bioavailable iron-based nutrient solution, at least one additional source of micronutrients in a liquid or solid phase being provided to the said bioavailable, iron-based nutrient solution.

13. The process for manufacturing an iron-based nutrient composition according to claim 1 wherein the at least one iron source is selected from the group consisting of $Fe_2(SO_4)_3 \cdot xH_2O$ where x is a molar coefficient of between 0 and 9, $MFe(SO_4)_2 \cdot 12H_2O$ where M is Na or K, $Fe(NO_3)_3 \cdot xH_2O$ where x is a molar coefficient between 0 and 9, $FeCl_3 \cdot xH_2O$ where x is a molar coefficient between 0 and 6, $Fe_4(P_2O_7)_3$, $FePO_4 \cdot xH_2O$ where is a molar coefficient between 0 and 4, $FeSO_4 \cdot xH_2O$ where x is a molar coefficient between 0 and 7, $FeCl_2 \cdot xH_2O$ where x is a molar coefficient between 0 and 4, $FeO \cdot xH_2O$ where x is a molar coefficient between 0 and 1, $Fe(NH_4)PO_4 \cdot H_2O$, iron oxysulfate, and mixtures thereof.

14. The process for manufacturing an iron-based nutrient composition according to claim 1 wherein said phosphate source is selected from the group consisting of sodium and potassium alkaline polyphosphates in powder or granule form.

15. The process according to claim 14, characterized in that the said at least one polyphosphate is selected from the group consisting of pyrophosphates and tripolyphosphates, comprising tetrapotassium pyrophosphate (TKPP), potassium tripolyphosphate (KTPP), sodium tripolyphosphate (STPP), sodium acid pyrophosphate (SAPP) and tetrasodium pyrophosphate (TSPP).

16. The process for manufacturing an iron-based nutrient composition according to claim 9 wherein the at least one additional source of micronutrients is selected from the group consisting of sources of B, Mn, Zn, Cu, Mo, Co and the mixtures thereof, and wherein the said at least one additional source of micronutrient is contained in an atomic ratio relative to Fe of between 0.1 and 5 for B, between 0.05 and 2.5 for Mn, between 0.01 and 1 for Zn, between 0.005 and 0.25 for Cu and Mo, and between 0.001 and 0.1 for Co.

17. The process for manufacturing an iron-based nutrient composition according to claim 9 wherein said at least one additional source of micronutrients is selected from the group consisting of $Zn(NH_3)_4SO_4$, $ZnCl_2$, $Zn(NO_3)_2 \cdot xH_2O$ where x is a molar coefficient between 0 and 3, zinc oxysulfate having a total weight fraction of zinc in the range of 20 to 60% relative to the weight of the compound, $ZnSO_4 \cdot xH_2O$ where x is a molar coefficient between 0 and 7, $Cu(OH)_2$, $CuCl$, $CuCl_2$, $3Cu(OH)_2 \cdot CuCl_2$, $CuSO_4 \cdot xH_2O$ where x is a molar coefficient between 0 and 5, $Cu(NH_4)PO_4 \cdot H_2O$, $MnCl_2 \cdot xH_2O$ where x is a molar coefficient between 0 and 4, manganese oxysulfate having a total weight fraction of manganese in the range of 30 to 50% relative to the weight of the compound, $MnSO_4 \cdot xH_2O$ where x is a molar coefficient between 0 and $(NH_4)_6Mo_7O_{24} \cdot 4H_2O$, $H_2MoO_4 \cdot H_2O$, $Na_2MoO_4 \cdot 2H_2O$, $H_3BO_3$, $Na_2B_{10}O_{16} \cdot 10H_2O$, $Na_2B_4O_7$, $Na_2B_4O_7 \cdot 5H_2O$, $Na_2B_4O_7 \cdot 10H_2O$, $Na_2B_8O_{13} \cdot 4H_2O$, $CoCl_2 \cdot 6H_2O$, $Co(NO_3)_2 \cdot 6H_2O$, and the mixtures thereof.

18. The process for manufacturing an iron-based nutrient composition according to claim 1 wherein the said phosphate source comprises phosphorus in orthophosphate form in a molar ratio $P_{ortho}/P_{total}$ of be 0 and 0.95, where $P_{ortho}$ is the number of phosphorus moles in orthophosphate form and where $P_{total}$ is the number of moles of total phosphorus.

19. The process for manufacturing an iron-based nutrient composition according to claim 1 wherein the at least one iron source and the said at least one phosphate source micronutrients are supplied in a molar ratio $P_{poly}/Fe$ of between 8 and 32, where Fe represents the total number of iron moles and where $P_{poly}$ represents the total number of phosphorus moles in polyphosphate form.

20. The process according to claim 1 further comprising ageing the solid-solid mixture before the forming of a water-soluble inorganic solid nutrient composition.

\* \* \* \* \*